(12) United States Patent
Maeda

(10) Patent No.: US 10,257,439 B2
(45) Date of Patent: Apr. 9, 2019

(54) SEMICONDUCTOR DEVICE, VIDEO DISPLAY SYSTEM AND VIDEO SIGNAL OUTPUT METHOD

(71) Applicant: LAPIS SEMICONDUCTOR CO., LTD., Kanagawa (JP)

(72) Inventor: Shusaku Maeda, Kanagawa (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 15/496,185

(22) Filed: Apr. 25, 2017

(65) Prior Publication Data
US 2017/0318234 A1 Nov. 2, 2017

(30) Foreign Application Priority Data
Apr. 27, 2016 (JP) .................................. 2016-089657

(51) Int. Cl.
| | |
|---|---|
| *H04N 21/43* | (2011.01) |
| *H04N 5/268* | (2006.01) |
| *H04N 5/067* | (2006.01) |
| *H04N 7/01* | (2006.01) |
| *H04N 7/08* | (2006.01) |

(52) U.S. Cl.
CPC .......... *H04N 5/268* (2013.01); *H04N 5/0675* (2013.01); *H04N 7/01* (2013.01); *H04N 7/0806* (2013.01)

(58) Field of Classification Search
CPC .... H04N 5/268; H04N 7/0806; H04N 5/0675; H04N 7/01; H04N 21/4307
See application file for complete search history.

(56) References Cited

U.S. PATENT DOCUMENTS

| 6,316,974 B1* | 11/2001 | Taraci .................... G09G 5/006 327/147 |
| 2005/0162338 A1* | 7/2005 | Ikeda ..................... G09G 5/006 345/2.1 |
| 2006/0061601 A1* | 3/2006 | Iga ......................... G06T 3/4023 345/660 |
| 2006/0077290 A1* | 4/2006 | Chung .................. G09G 5/006 348/441 |

(Continued)

FOREIGN PATENT DOCUMENTS

| JP | H10-173995 A | 6/1998 | |
| WO | WO-2012029228 A1 * | 3/2012 | ............... G09G 5/12 |

*Primary Examiner* — Ibrahim A Khan
(74) *Attorney, Agent, or Firm* — Volentine, Whitt & Francos, PLLC

(57) ABSTRACT

A semiconductor device including a selection section that selects and outputs one video signal from plural input video signals; a clock signal output section that outputs a clock signal that corresponds to the video signal selected by the selection section; and a masking section that, for a predetermined period starting from a point when the clock signal output from the clock signal output section is switched in accordance with a switching of the selection of the video signal, performs masking processing on a synchronization signal that, among plural synchronization signals that correspond respectively to the plural video signals, corresponds to the video signal selected by the selection section. The selection section outputs the selected video signal in synchronization with the synchronization signal that corresponds to the selected video signal and that has undergone masking processing.

9 Claims, 8 Drawing Sheets

(56) References Cited

U.S. PATENT DOCUMENTS

| | | | | |
|---|---|---|---|---|
| 2008/0143637 A1* | 6/2008 | Sunahara | ............ | G06F 3/1446 345/1.1 |
| 2009/0180027 A1* | 7/2009 | Jang | ............ | H04N 9/66 348/639 |
| 2009/0213110 A1* | 8/2009 | Kato | ............ | G09G 5/395 345/418 |
| 2009/0268824 A1* | 10/2009 | Fukuda | ............ | H04L 25/4904 375/244 |
| 2011/0242383 A1* | 10/2011 | Yamazaki | ............ | H04N 5/3742 348/302 |
| 2017/0041086 A1* | 2/2017 | Park | ............ | H04B 15/02 |
| 2017/0127116 A1* | 5/2017 | Maeda | ............ | G09G 3/36 |
| 2017/0142295 A1* | 5/2017 | Okada | ............ | H04N 21/4307 |

* cited by examiner

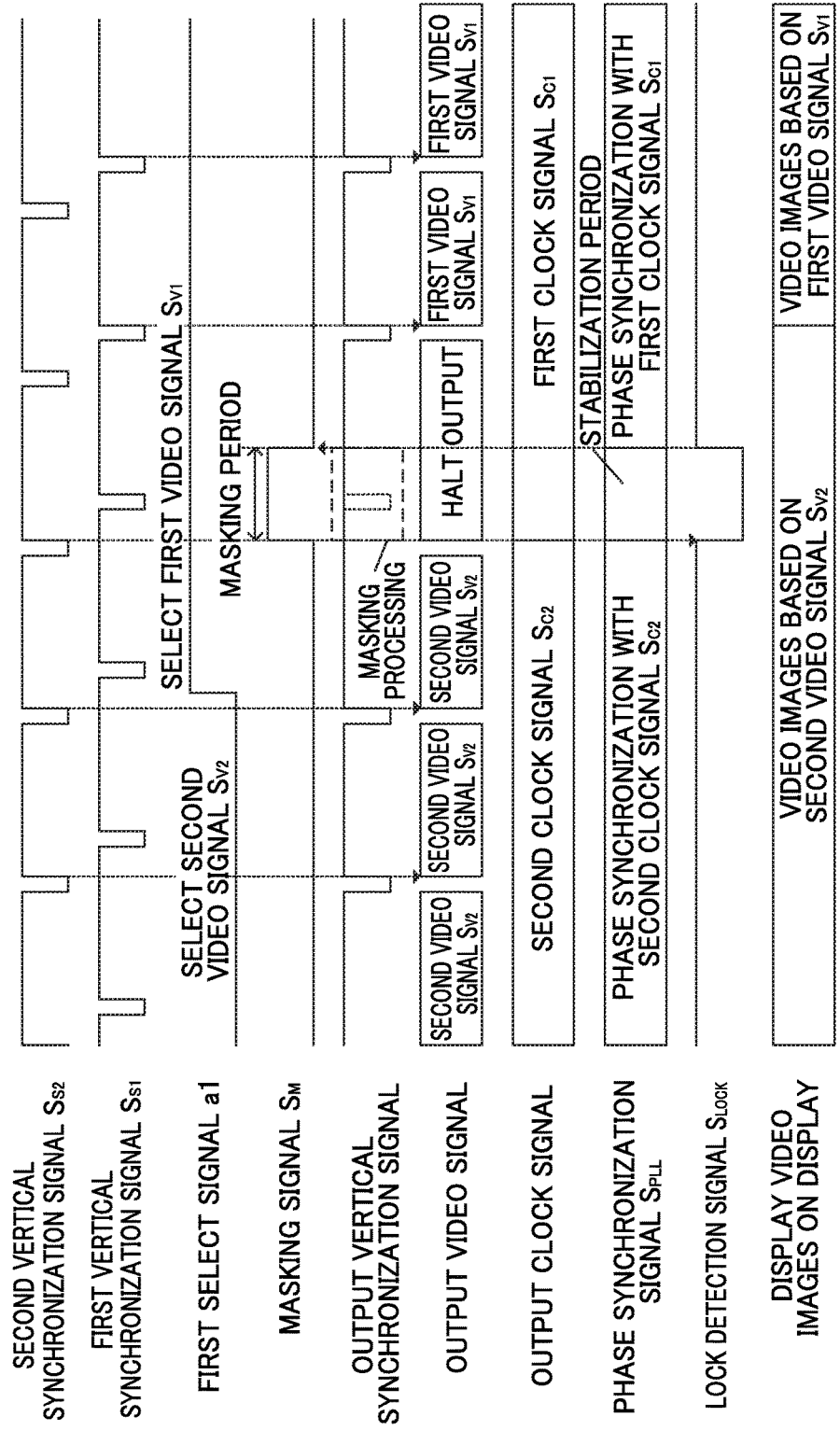

SEMICONDUCTOR DEVICE, VIDEO DISPLAY SYSTEM AND VIDEO SIGNAL OUTPUT METHOD

CROSS-REFERENCE TO RELATED APPLICATION

This application is based on and claims priority under 35 USC 119 from Japanese Patent Application No. 2016-089657 filed on Apr. 27, 2016, the disclosure of which is incorporated by reference herein.

BACKGROUND

Technical Field

The present disclosure relates to a semiconductor, a video display system, and a video signal output method.

Related Art

The following technology is known for selecting and displaying one video image from among plural video images. Japanese Patent Application Laid-Open (JP-A) No. 10-173995 discloses a video signal switching circuit that switches plural input video signals and outputs one video signal. This video signal switching circuit includes a multiplexer that uses a select signal to output one input video signal from among plural input video signals, a detection circuit that detects a vertical synchronization signal of the original input video signal, and a switching signal generating circuit that, based on an input video switching signal, outputs the select signal in synchronization with the vertical synchronization signal of the original input video signal.

In a video display system such as a car navigation system, since the display resolutions are increasingly high, communication between a display controller and a display is performed using high-speed serial communication such as LVDS (Low Voltage Differential Signaling). In such system, a video signal is converted in the display controller from parallel data into serial data, and is then supplied to the display.

On the other hand, the display includes a serial/parallel conversion section that converts the video signal in serial data, supplied from the display controller, into parallel data. In addition, a clock signal that corresponds to that video signal is supplied to the display from the display controller together with the video signal. The display has a PLL (Phase Locked Loop) circuit that generates a phase synchronization circuit that is in phase synchronization with this clock signal. The serial/parallel conversion section performs data conversion processing in synchronization with the phase synchronization signal generated by the PLL circuit.

When the video signal supplied from the display controller is switched, the clock signal is also switched to one that corresponds to the post-switching video signal. In this case, in the PLL circuit, a phase synchronization signal that is in phase synchronization with the post-switching clock signal is generated, however, the PLL circuit is in a locked state and time is needed before the phase synchronization signal is stabilized. During the stabilization period between the switching of the clock signal that accompanies the switching of the video signal and the stabilization of the phase synchronization signal output from the PLL circuit, the serial/parallel conversion section may be unable to perform processing properly, and in some cases disturbance of the video images displayed on the display occurs.

SUMMARY

The present disclosure provides a semiconductor device, a video display system, and a video signal output method that may suppress disturbance in a video image in a case in which a video signal is switched.

A first aspect of the present disclosure is a semiconductor device including: a selection section that selects one video signal from plural input video signals, and outputs the selected video signal; a clock signal output section that, among plural clock signals that correspond respectively to the plural video signals, outputs a clock signal that corresponds to the video signal selected by the selection section; and a masking section that, for a predetermined period starting from a point when the clock signal output from the clock signal output section is switched in accordance with a switching of the selection of the video signal at the selection section, performs masking processing on a synchronization signal that, among plural synchronization signals that correspond respectively to the plural video signals, corresponds to the video signal selected by the selection section, wherein the selection section outputs the selected video signal in synchronization with the synchronization signal that corresponds to the selected video signal and that has undergone masking processing.

A second aspect of the present disclosure is a video display system including: the semiconductor device according to the first aspect; and a display section that displays video images in accordance with the video signal selected by the selection section from among the plural video signals.

A third aspect of the present disclosure is an image signal output method including: selecting one video signal from plural input video signals; outputting the selected video signal and a clock signal that corresponds to the selected video signal from plural clock signals that correspond respectively to the plural video signals; performing masking processing for a predetermined period starting from a point when the clock signal output in accordance with a switching of the selection of the video signal is switched, wherein the masking processing masks a synchronization signal that corresponds to the selected video signal among a plural synchronization signals that correspond respectively to the plural video signals; and outputting the selected video signal in synchronization with a synchronization signal that corresponds to the selected video signal and that has undergone the masking processing.

According to the above-described aspects, the present disclosure may provide a semiconductor device, a video display system, and a video signal output method that may suppress disturbance in a video image in a case in which a video signal is switched.

BRIEF DESCRIPTION OF THE DRAWINGS

Exemplary embodiments will be described in detail based on the following figures, wherein:

FIG. 8 is a timing chart illustrating operations of a semiconductor device and a display according to alternative exemplary embodiment of the present disclosure.

DETAILED DESCRIPTION

Hereinafter, exemplary embodiments of the present disclosure will be described with reference made to the drawings. Note that, in each drawing, the same or equivalent component elements and portions are given the same reference number and any duplicated description thereof will be omitted if appropriate.

First Exemplary Embodiment

Figure 1:
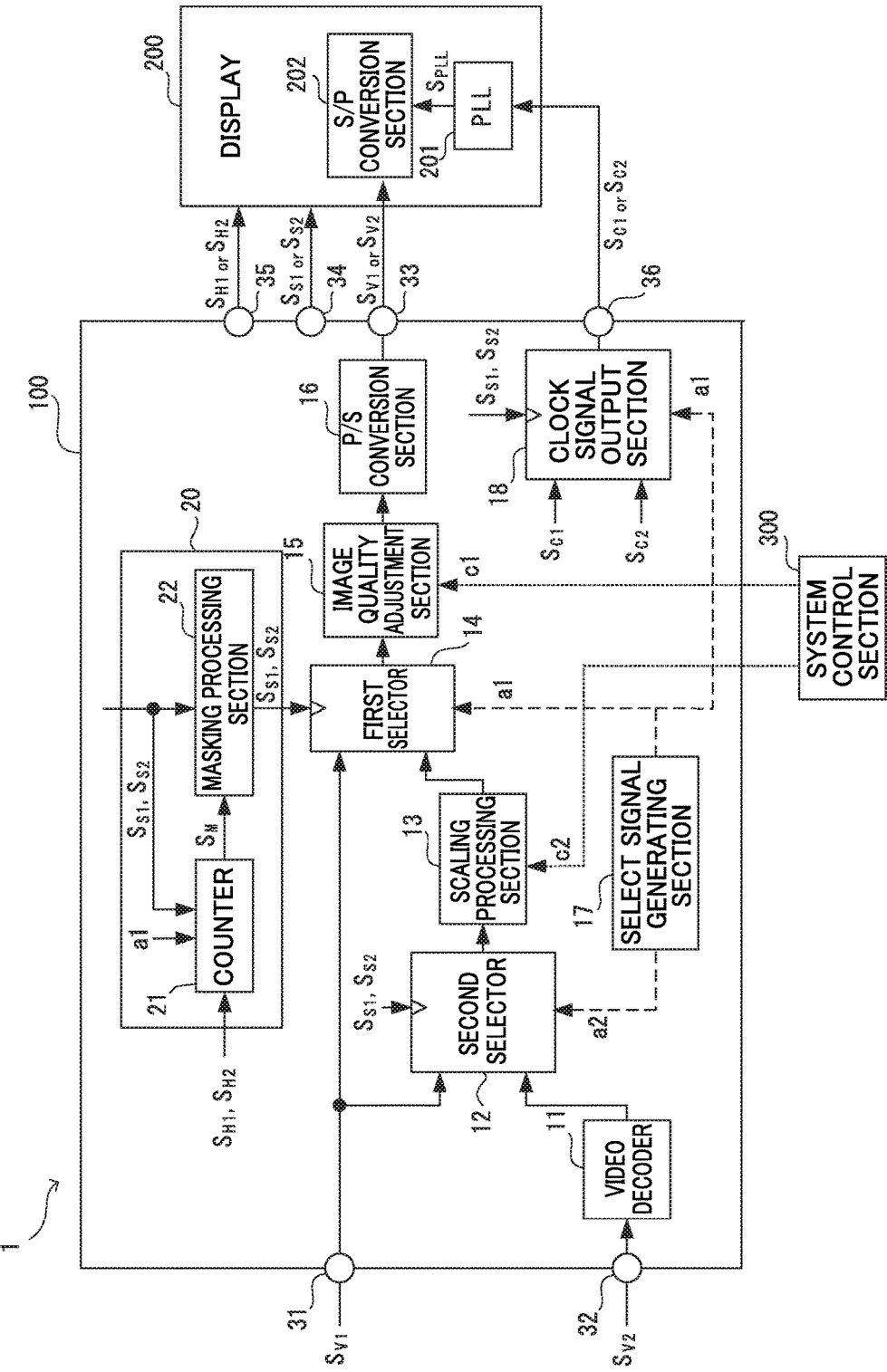
FIG. 1 is a block diagram illustrating the configuration of a video display system and a semiconductor device according to an exemplary embodiment of the present disclosure.

FIG. 1 is a block diagram illustrating the configuration of a video display system 1 which includes a semiconductor device 100 according to a first exemplary embodiment of the present disclosure. The video display system 1 is formed including the semiconductor device 100, a display 200, and a system control section 300. The semiconductor device 100 is a display controller that, under the control of the system control section 300, selects video images to be displayed on the display 200, and performs scaling processing and image adjustment and the like. Each signal output from the semiconductor device 100 is transmitted to the display 200 via high-speed serial communication such as LVDS or the like.

The semiconductor device 100 is formed so as to include a video decoder 11, a scaling processing section 13, an image quality adjustment section 15, a parallel/serial conversion section 16 (hereinafter, referred to as a P/S conversion section 16), a select signal generating section 17, a first selector 14, a second selector 12, a clock signal output section 18, a masking section 20, video signal input terminals 31 and 32, a video signal output terminal 33, a clock signal output terminal 36, a vertical synchronization signal output terminal 34, and a horizontal synchronization signal output terminal 35.

Video signals from outside the semiconductor device 100 are input into the video signal input terminals 31 and 32. In the present exemplary embodiment, a first video signal $S_{V1}$, which is a digital video signal, is input into the video signal input terminal 31, and a second video signal $S_{V2}$, which is an analog video signal, is input into the video signal input terminal 32. In addition, a first vertical synchronization signal $S_{S1}$ that corresponds to the first video signal $S_{V1}$ and a second vertical synchronization signal $S_{S2}$ that corresponds to the second video signal $S_{V2}$ are input into the semiconductor device 100.

In a case in which the video display system 1 is applied, for example, to a car navigation system, the first video signal $S_{V1}$ may correspond to navigation images including mapping images, while the second video signal $S_{V2}$ may correspond to video images that are captured by a camera of a reversing monitor.

The video decoder 11 converts the second video signal $S_{V2}$, which is an analog video signal, into a digital signal. Note that, in a case in which the second video signal $S_{V2}$ is a component video signal in which the video signal and the synchronization signal have been synthesized, then the video signal and the synchronization signal are separated by the video decoder 11.

The first video signal $S_{V1}$, the first vertical synchronization signal $S_{S1}$, the second video signal $S_{V2}$ that has been converted into a digital signal by the video decoder 11, and the second vertical synchronization signal $S_{S2}$ are input into the second selector 12. A second select signal a2 that is generated by the select signal generating section 17 and contains a select command for the video signal is also input into the second selector 12. Based on this second select signal a2, the second selector 12 selects one out of the first video signal $S_{V1}$ and the second video signal $S_{V2}$ that has been converted into a digital signal. The second selector 12 then outputs the selected video signal in synchronization with the vertical synchronization signal that corresponds to the selected video signal. For example, when the second selector 12 selects the first video signal $S_{V1}$ based on the select signal a2, the second selector 12 synchronizes the first video signal $S_{V1}$ with the first vertical synchronization signal $S_{S1}$, which corresponds to the first video signal $S_{V1}$, and then outputs the first video signal $S_{V1}$.

The scaling processing section 13 performs scaling processing on the video signal output from the second selector 12 to make the size of the video image that is based on that video signal match the size of the display 200.

Figure 2:
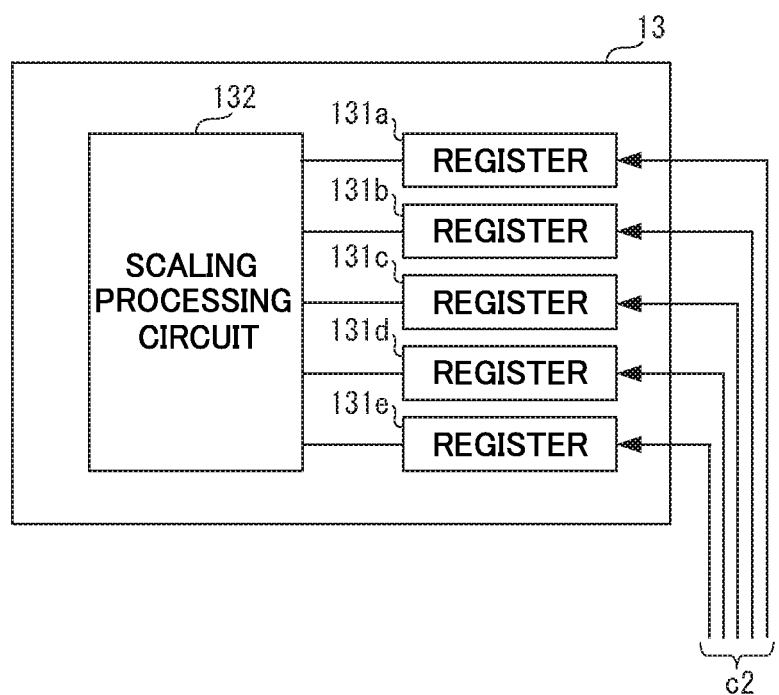
FIG. 2 is a block diagram illustrating the configuration of a scaling processing section according to an exemplary embodiment of the present disclosure.

FIG. 2 is a block diagram illustrating the configuration of the scaling processing section 13. The scaling processing section 13 is formed so as to include a scaling processing circuit 132, and plural registers 131a through 131e. The scaling processing circuit 132 performs scaling processing on the input video signal in accordance with set values held in the registers 131a through 131e. The registers 131a through 131e are storage sections that hold rewriteable set values c2 that are used for the scaling processing. The set values c2 held in the registers 131a through 131e are supplied from the system control section 300 that is provided externally of the semiconductor device 100.

When a video signal output from the semiconductor device 100 (hereinafter, referred to as an 'output video signal') is switched, then the settings of the scaling processing section 13 are changed by rewriting the set values c2 held in the registers 131a through 131e of the scaling processing section 13. For example, in a case in which an output video signal is switched from the second video signal $S_{V2}$ to the first video signal $S_{V1}$, then the set values c2 held in the registers 131a through 131e of the scaling processing section 13 are rewritten from the set values corresponding to the pre-switching second video signal $S_{V2}$ to set values that correspond to the post-switching first video signal $S_{V1}$.

The first video signal $S_{V1}$ which has not undergone scaling processing, the first or second video signals that have undergone scaling processing in the scaling processing section 13, and the first vertical synchronization signal $S_{S1}$ and second vertical synchronization signal $S_{S2}$ are input into the first selector 14. In addition, a first select signal a1 that was generated by the select signal generating section 17 and contains a select command for the video signal is also input into the first selector 14. Note that the first vertical synchronization signal $S_{S1}$ and the second vertical synchronization signal $S_{S2}$ that are input into the first selector 14 are supplied from the masking section 20. Based on the first select signal a1, the first selector 14 selects one of the two input video signals. The first selector 14 then outputs the selected video signal in synchronization with the vertical synchronization signal that corresponds to the selected video signal. For example, in a case in which the first selector 14 selects the first video signal $S_{V1}$ which has not undergone scaling processing based on the select signal a1 the first selector 14 synchronizes the first video signal $S_{V1}$ with the first vertical synchronization signal $S_{S1}$, and outputs the first video signal $S_{V1}$.

Figure 3:
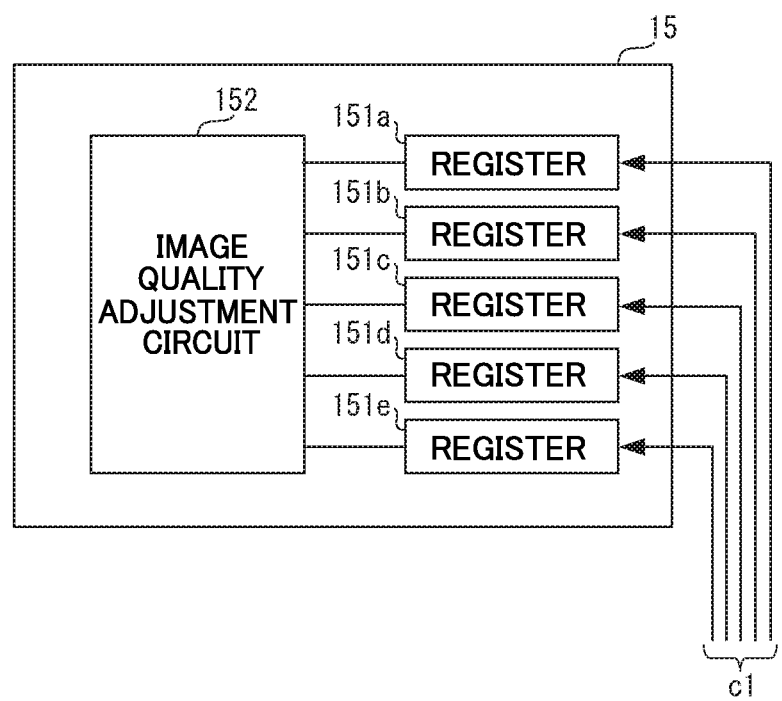
FIG. 3 is a block diagram illustrating the configuration of an image quality adjustment section according to an exemplary embodiment of the present disclosure.

The image quality adjustment section 15 adjusts image quality such as contrast adjustment, offset adjustment, and gamma correction to the video signal output from the first selector 14. FIG. 3 is a block diagram illustrating the configuration of the image quality adjustment section 15. The image quality adjustment section 15 include an image quality adjustment circuit 152, and plural registers 151a through 151e. The image quality adjustment circuit 152 performs image quality adjustment processing on an input video signal in accordance with set values held in the registers 151a through 151e. The registers 151a through 151e are storage sections that hold rewriteable set values c1 that are used for the image quality adjustment. More specifically, the registers 151a through 151e hold set values for each category of image quality adjustment such as contrast, offset, and gamma correction and the like. The set values c1 held in the registers 151a through 151e are supplied from the system control section 300 that is provided externally of the semiconductor device 100.

When an output video signal is switched in the semiconductor device 100, then the settings of the image quality adjustment section 15 are changed by rewriting the set values c1 held in the registers 151a through 151e of the image quality adjustment section 15. For example, in a case in which an output video signal is switched from the second video signal $S_{V2}$ to the first video signal $S_{V1}$, the set values c1 held in the registers 151a through 151e of the image quality adjustment section 15 are rewritten from the set values corresponding to the pre-switching second video signal $S_{V2}$ to set values that correspond to the post-switching first video signal $S_{V1}$.

The P/S conversion section 16 converts a video signal that is in the form of parallel data and that has undergone image quality adjustment in the image quality adjustment section 15 into serial data, and then outputs the video signal. The video signal output from the P/S conversion section 16 is output from the video signal output terminal 33 to the outside of the semiconductor device 100, and is supplied to the display 200. In addition, the vertical synchronization signals $S_{S1}$ and $S_{S2}$ and the horizontal synchronization signals $S_{H1}$ and $S_{H2}$ that correspond to the video signal output from the video signal output terminal 33 are also output respectively from the vertical synchronization signal output terminal 34 and the horizontal synchronization signal output terminal 35 to the outside of the semiconductor device 100, and are supplied to the display 200.

The select signal generating section 17 generates the first select signal a1 and the second select signal a2 that include the select commands for the video signals to be selected by the first selector 14 and the second selector 12. For example, in a case in which a video image that is based on the first video signal $S_{V1}$ is displayed on the display 200, and in a case in which the size of the video image that is based on the first video signal $S_{V1}$ is suitable for the size of the display 200, the select signal generating section 17 generates the first select signal a1 that selects the first signal $S_{V1}$ that was input directly into the first selector 14. On the other hand, in a case in which a video image that is based on the first video signal $S_{V1}$ is displayed on the display 200, but the size of this video image is not suitable for the size of the display 200, the select signal generating section 17 generates the second select signal a2 that selects the first signal $S_{V1}$ that was input into the second selector 12, and also generates the first select signal a1 that selects the first signal $S_{V1}$ that has undergone scaling processing and was input into the first selector 14. Moreover, in a case in which a video image that is based on the second video signal $S_{V2}$ is displayed on the display 200, the select signal generating section 17 generates the second select signal a2 that selects the second signal $S_{V2}$ that was input into the second selector 12, and also generates the first select signal a1 that selects the second signal $S_{V2}$ that has undergone scaling processing and was input into the first selector 14.

The select signal generating section 17 contains registers (not illustrated in the drawings), and generates the first select signal a1 and the second select signal a2 in accordance with set values held in these registers. The set values held in the registers are supplied from the system control section 300 that is provided externally of the semiconductor device 100. Note that the first select signal a1 and the second select signal a2 are not in synchronization with the first vertical synchronization signal $S_{S1}$ and the second vertical synchronization signal $S_{S2}$.

A first clock signal $S_{C1}$ that corresponds to the first video signal $S_{V1}$ and a second clock signal $S_{C2}$ that corresponds to the second video signal $S_{V2}$ are input to the clock signal output section 18. In addition, the first vertical synchronization signal $S_{S1}$, the second vertical synchronization signal $S_{S2}$, and the first select signal a1 are also input to the clock signal output section 18. Based on the first select signal a1, the clock signal output section 18 selects one of the two input clock signals, and then outputs the selected clock signal in synchronization with the first vertical synchronization signal $S_{S1}$ or the second vertical synchronization signal $S_{S2}$. The clock signal output section 18 selects the clock signal that corresponds to the video signal selected by the first selector 14. In accordance with the switching of the selection of the video signal in the first selector 14, the clock signal output section 18 switches the output clock signal to a clock signal that corresponds to the post-switching video signal. In the present exemplary embodiment, the clock signal output section 18 switches the output clock signal to a clock signal that corresponds to the post-switching video signal at the timing of the rise of the vertical synchronization signal that corresponds to the pre-switching video signal immediately after the level transition of the first select signal 1a has occurred. Of the first clock signal $S_{C1}$ and the second clock signal $S_{C2}$, the clock signal that is output from the clock signal output section 18 is output from the clock signal output terminal 36 to the outside of the semiconductor device 100, and is supplied to the display 200.

The first vertical synchronization signal $S_{S1}$, the second vertical synchronization signal $S_{S2}$, the first horizontal synchronization signal $S_{H1}$, the second horizontal synchronization signal $S_{H2}$ are input to the masking section 20. Note that the first horizontal signal $S_{H1}$ corresponds to the first video signal $S_{V1}$, while the second horizontal signal $S_{H2}$ corresponds to the second video signal $S_{V2}$. When the video signal selected by the first selector 14 is switched, the masking section 20 masks the first vertical synchronization signal $S_{S1}$ and the second vertical synchronization signal $S_{S2}$ for a predetermined period, and outputs the masked first vertical synchronization signal $S_{S1}$ and second vertical synchronization signal $S_{S2}$. The first vertical synchronization signal $S_{S1}$ and the second vertical synchronization signal $S_{S2}$ that have undergone masking processing in the masking section 20 are supplied to the first selector 14.

Note that, in the present exemplary embodiment, a case in which masking processing is performed on both the first vertical synchronization signal $S_{S1}$ and the second vertical synchronization signal $S_{S2}$ in the masking section 20, is described. However, it is sufficient to perform masking processing to at least on the vertical synchronization signal out of the first vertical synchronization signal $S_{S1}$ and the second vertical synchronization signal $S_{S2}$ that corresponds to the post-switching video signal. For example, in a case in which the video signal selected by the first selector 14 is switched from the second video signal $S_{V2}$ to the first video signal $S_{V1}$, then the masking section 20 only needs to perform masking processing on the post-switching first vertical synchronization signal $S_{S1}$.

The masking section 20 includes a counter 21 and a masking processing section 22. The counter 21 starts counting a pulse number of the input first horizontal synchronization signal $S_{H1}$ or second horizontal synchronization signal $S_{H2}$ at the timing of the rise of the vertical synchronization signal that corresponds to the pre-switching video signal, immediately after the level transition of the first select signal a1, which indicates the switching of the video signal, has occurred. Namely, the timing when the counter 21 starts the count matches the timing when the clock signal output from the clock signal output section 18 in accordance with the switching of the video signal is switched. The counter 21 outputs a masking signal $S_M$ of a high level during the period from the starting of the count until the count value reaches a predetermined value, and during other periods outputs a masking signal $S_M$ of a low level, and supplies this masking signal $S_M$ to the masking processing section 22. Note that the signal counted by the counter 21 may be either one of the horizontal synchronization signals $S_{H1}$ and $S_{H2}$.

The masking processing section 22 performs masking processing on the input first vertical synchronization signal $S_{S1}$ and second vertical synchronization signal $S_{S2}$ during the period when the masking signal $S_M$ is in a high level, and supplies the first vertical synchronization signal $S_{S1}$ and second vertical synchronization signal $S_{S2}$ that have undergone this masking processing to the first selector 14. During the period when the masking processing is being performed (hereinafter, referred to as the 'masking period'), level transitions generated in the first vertical synchronization signal $S_{S1}$ and second vertical synchronization signal $S_{S2}$ are made invalid. Accordingly, during the masking period, the first selector 14 is unable to output a post-switching video signal in synchronization with a vertical synchronization signal.

The video signal out of the first video signal $S_{V1}$ and the second video signal $S_{V2}$ that is selected by the first selector 14 and the second selector 12 is output from the video signal output terminal 33. The vertical synchronization signal out of the first vertical synchronization signal $S_{S1}$ and second vertical synchronization signal $S_{S2}$ that corresponds to the video signal selected by the first selector 14 and the second selector 12, and that has undergone masking processing in the masking section 20 is output from the vertical synchronization signal output terminal 34. The horizontal synchronization signal out of the first horizontal synchronization signal $S_{H1}$ and second horizontal synchronization signal $S_{H2}$ that corresponds to the video signal selected by the first selector 14 and the second selector 12 is output from the horizontal synchronization signal output terminal 35. The clock signal out of the first clock signal $S_{C1}$ and second clock signal $S_{C2}$ that corresponds to the video signal selected by the first selector 14 and the second selector 12 is output from the clock signal output terminal 36.

The display 200 includes a PLL circuit 201 and a serial/parallel conversion section 202 (hereinafter, referred to as an S/P conversion section 202). The first clock signal $S_{C1}$ or second clock signal $S_{C2}$ that is output from the clock signal output section 18 is input into the PLL circuit 201. The PLL circuit 201 generates a phase synchronization signal $S_{PLL}$ that is in phase synchronization with the input first clock signal $S_{C1}$ or second clock signal $S_{C2}$, and supplies this signal to the S/P conversion section 202.

The first video signal $S_{V1}$ or the second video signal $S_{V2}$ that was output from the P/S conversion section 16 and is in a serial data format, is input into the S/P conversion section 202. The S/P conversion section 202 converts the input first video signal $S_{V1}$ or the second video signal $S_{V2}$ that is in a serial data format, into parallel data. The S/P conversion section 202 performs the data conversion processing in synchronization with the phase synchronization signal $S_{PLL}$ that has been supplied from the PLL circuit 201. In the S/P conversion section 202, in a case in which data conversion processing is being performed on the first video signal $S_{V1}$, then the phase synchronization signal $S_{PLL}$ that has been phase-synchronized with the first clock signal $S_{C1}$ is used, while in a case in which data conversion processing is being performed on the second video signal $S_{V2}$, then the phase synchronization signal $S_{PLL}$ that has been phase-synchronized with the second clock signal $S_{C2}$ is used. The display 200 displays a video image that is based on the first video signal $S_{V1}$ or the second video signal $S_{V2}$ that was converted into parallel data by the S/P conversion section 202 on the display screen.

Figure 4:
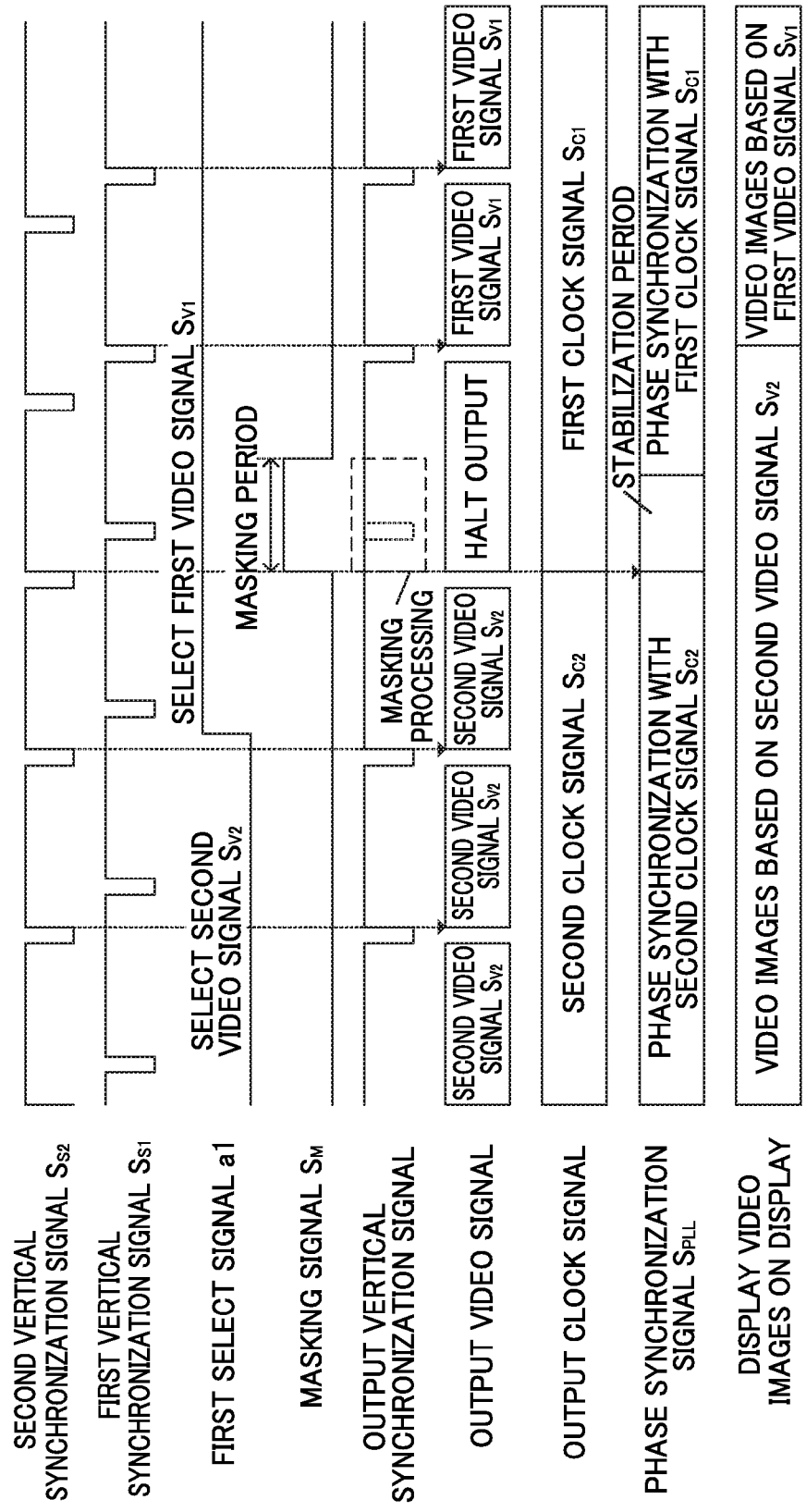
FIG. 4 is a timing chart illustrating operations of a semiconductor device and a display according to an exemplary embodiment of the present disclosure.

FIG. 4 is a tinting chart illustrating an example of operations of the semiconductor device 100 and the display 200. In FIG. 4 are illustrated examples of temporal transitions of the first vertical synchronization signal $S_{S1}$, the second vertical synchronization signal $S_{S2}$, the first select signal a1, the masking signal $S_M$, a vertical synchronization signal output from the semiconductor device 100 (hereinafter, referred to as an 'output vertical synchronization signal'), an output video signal, a clock signal output from the semiconductor device 100 (hereinafter referred to as an 'output clock signal'), an origin of the phase synchronization signal $S_{PLL}$, and a video signal displayed on the display 200. In FIG. 4, as an example, an operation performed when the output video signal is switched from the second video signal $S_{V2}$ to the first video signal $S_{V1}$ is illustrated, and this case is described below as an example.

When the first selector 14 detects a transition in the signal level of the first select signal a1, the first selector 14 continues the output of the pre-switching second video signal $S_{V2}$ until the end point of the frame period of the pre-switching second video signal $S_{V2}$, immediately after the transition of the signal level of the first select signal a1. Note that the end point of the frame period of the second video signal $S_{V2}$ can be detected using the second vertical synchronization signal $S_{S2}$. After the frame period of the pre-switching second video signal $S_{V2}$ has ended, the first selector 14 outputs the post-switching first video signal $S_{V1}$ in synchronization with the first vertical synchronization signal $S_{S1}$ that corresponds to thereto. Accordingly, when the first selector 14 switches the video signal that is selected based on the first select signal a1, the first selector 14 synchronizes the timing when the output of the pre-switching video signal is ended with the vertical synchronization signal that corresponds to the pre-switching video signal, and synchronizes the timing when the output of the post-switching video signal is started with the vertical synchronization signal that corresponds to the post-switching video signal.

Because the first vertical synchronization signal $S_{S1}$ and the second vertical synchronization signal $S_{S2}$ are asynchronous, as is described above, when the operation of the first selector 14 is synchronized with the first vertical synchronization signal $S_{S1}$ and the second vertical synchronization signal $S_{S2}$, the end point of the output of the pre-switching second video signal $S_{V2}$ does not match the start point of the output of the post-switching first video signal $S_{V1}$. The first selector 14 stops the output of the video signal between the end point of the output of the pre-switching second video signal $S_{V2}$ and the start point of the output of the post-switching first video signal $S_{V1}$.

The first video signal $S_{V1}$ output from the first selector 14 is supplied to the display 200 via the image quality adjustment section 15 and the P/S conversion section 16. In addition, the first vertical synchronization signal $S_{S1}$ and the first horizontal synchronization signal $S_{H1}$ that correspond to the post-switching first video signal $S_{V1}$ are supplied together with the first video signal $S_{V1}$ to the display 200.

In contrast, when the clock signal output section 18 detects a transition in the signal level of the first select signal a1, the clock signal output section 18 switches the output clock signal from the second clock signal $S_{C2}$ to the first clock signal $S_{C1}$ at the timing of the rise of the second vertical synchronization signal $S_{S2}$ (corresponding to the pre-switching second video signal $S_{V2}$), immediately after the transition of the signal level of the first select signal a1.

The PLL circuit 201 of the display 200 generates the phase synchronization signal $S_{PLL}$ that is in phase synchronization with the first clock signal $S_{C1}$ in accordance with the switching of the output clock signal to the first clock signal $S_{C1}$. However, the PLL circuit requires a certain amount of time until the post-switching clock signal can be placed in a locked state. Namely, stabilization time is required until the phase synchronization signal $S_{PLL}$ that is in phase synchronization with the post-switching clock signal is stabilized. The S/P conversion section 202 of the display 200 performs data conversion processing on the post-switching first video signal $S_{V1}$ in synchronization with the phase synchronization signal $S_{PLL}$ that has already been phase-synchronized with the first clock signal $S_{C1}$. However, suitable data conversion processing cannot be performed until the phase synchronization signal $S_{PLL}$ has stabilized.

When the counter 21 detects a transition in the signal level of the first select signal a1, the counter 21 starts counting the pulse number of the horizontal synchronization signal $S_{H1}$ or $S_{H2}$ at the timing of the rise of the second vertical synchronization signal $S_{S2}$ (corresponding to the pre-switching second video signal $S_{V2}$), immediately after the transition of the signal level of the first select signal a1. The counter 21 outputs a masking signal $S_M$ of a high level during the period from the starting of the count until the count value reaches a predetermined value, and supplies this to the masking processing section 22.

The masking processing section 22 performs masking processing on the input first vertical synchronization signal $S_{S1}$ and second vertical synchronization signal $S_{S2}$ during the period in which the masking signal $S_M$ is in a high level. Then, the masking processing section 22 supplies the first vertical synchronization signal $S_{S1}$ and second vertical synchronization signal $S_{S2}$ that have undergone this masking processing to the first selector 14. During the masking period, level transitions generated in the first vertical synchronization signal $S_{S1}$ and second vertical synchronization signal $S_{S2}$ are made invalid.

Here, the starting point of the masking period coincides with the switching point of the output clock signal, namely, with the starting point of the stabilization period of the PLL circuit 201. In contrast, the count value of the counter 21 is set such that the length of the masking period is either the same as the stabilization period of the PLL circuit or is longer than this stabilization period. Namely, the masking period overlaps with the stabilization period of the PLL circuit 201. Therefore, the first vertical synchronization signal $S_{S1}$ and second vertical synchronization signal $S_{S2}$ are masked during this stabilization period of the PLL circuit 201. Accordingly, the first selector 14 does not switch the selection of the video signal during the stabilization period of the PLL circuit 201, but outputs the first video signal $S_{V1}$, which is the post-switching video signal, at the timing of the rise of the first vertical synchronization signal $S_{S1}$ that is generated after the masking period (i.e., after the stabilization period of the PLL circuit 201). After the stabilization period of the PLL circuit 201 has ended, the first video signal $S_{V1}$, which is the post-switching video signal, is input into the S/P conversion section 202 of the display 200. As a consequence, the S/P conversion section 202 is able to perform data conversion processing on the post-switching first video signal $S_{V1}$ using the post-stabilization phase synchronization signal $S_{PLL}$.

Figure 5:
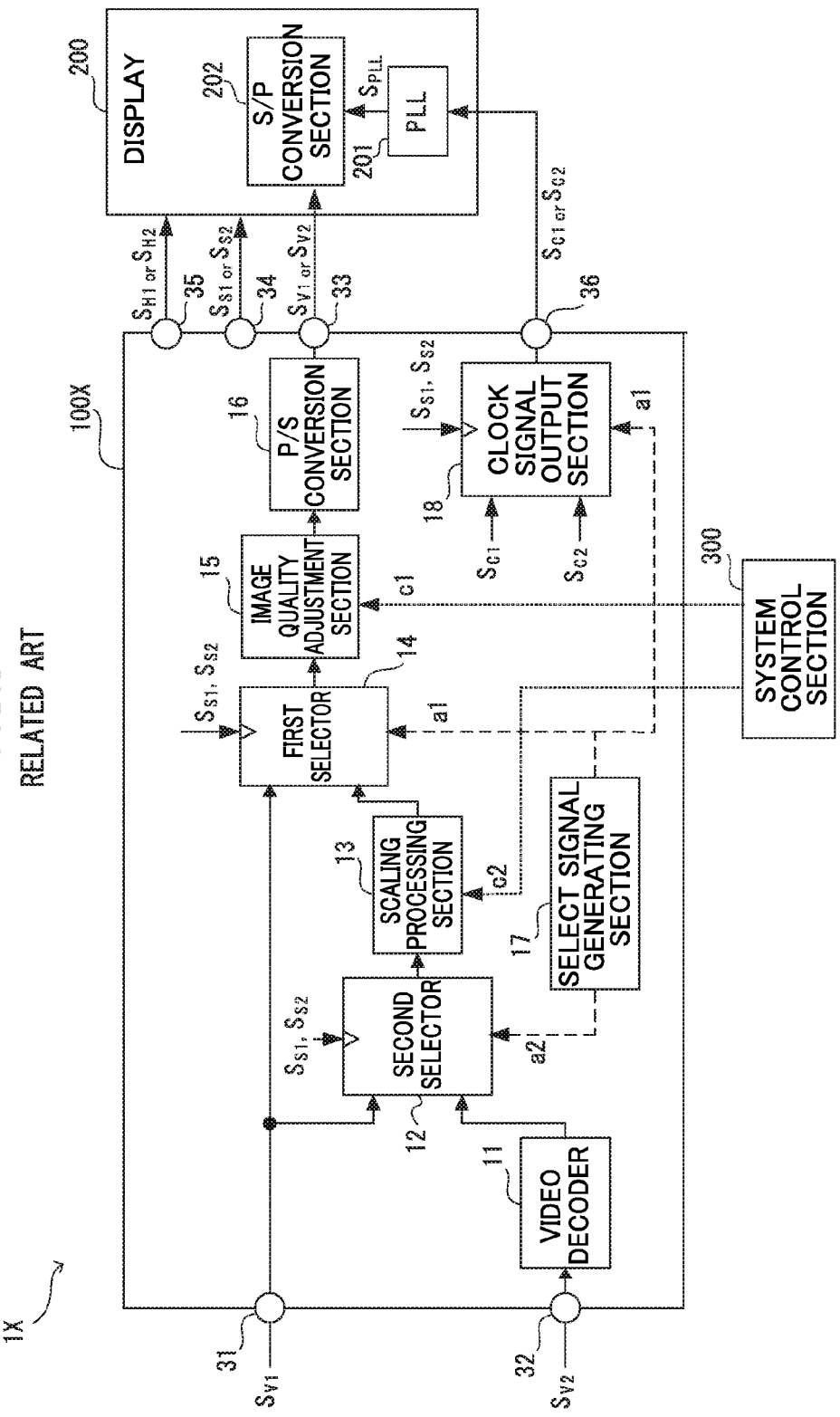
FIG. 5 is a block diagram illustrating the configuration of a video display system and a semiconductor device according to a comparative example.

Here, FIG. 5 is a block diagram illustrating the configuration of a video display system 1X that includes a semiconductor device 100X according to a comparative example. The semiconductor device 100X according to the comparative example differs from the semiconductor device 100 according to the above-described exemplary embodiment of the present disclosure in that the masking section 20 is not provided. Namely, in the semiconductor device 100X according to the comparative example, the first vertical synchronization signal $S_{S1}$ and the second vertical synchronization signal $S_{S2}$ are input into the first selector 14 without having undergone masking processing.

Figure 6:
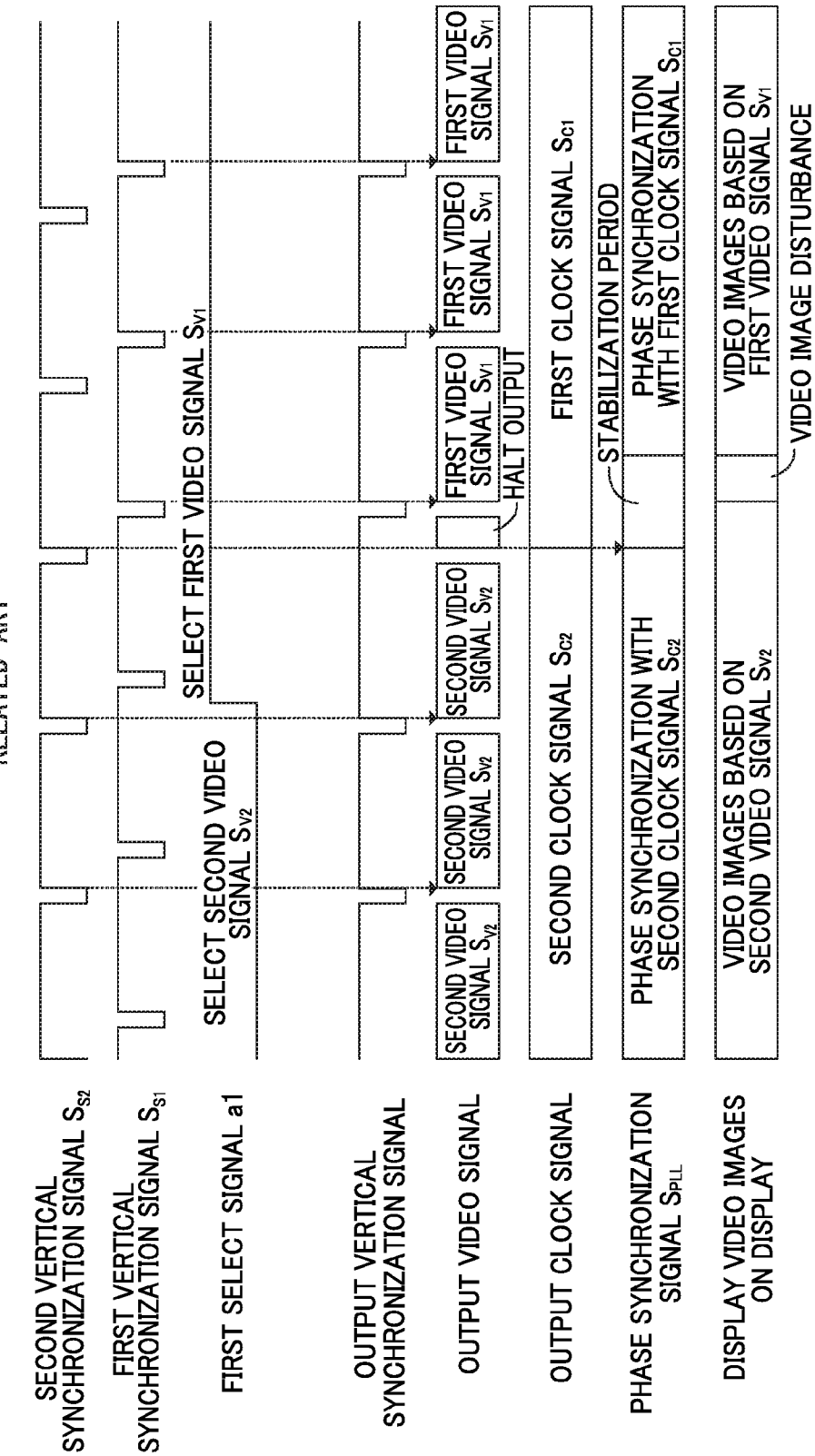
FIG. 6 is a timing chart illustrating operations of a semiconductor device and a display according to a comparative example.

FIG. 6 is a timing chart illustrating an example of operations of the semiconductor device 100X and the display 200 according to the comparative example. In FIG. 6, an operation performed when the output video signal is switched from the second video signal $S_{V2}$ to the first video signal $S_{V1}$ is described as an example.

According to the semiconductor device 100X according to the comparative example, masking processing is not performed on the first vertical synchronization signal $S_{S1}$ and the second vertical synchronization signal $S_{S2}$. Accordingly, as is illustrated in FIG. 6, there may be cases in which the output video signal is switched within the stabilization period of the PLL circuit 201. When the output video signal is switched within the stabilization period of the PLL circuit 201, the S/P conversion section 202 of the display 200 performs data conversion processing using the pre-stabilization phase synchronization signal $S_{PLL}$, and in some cases, the proper processing cannot be performed. As a result, there may be cases in which disturbance of the video images are displayed on the display 200.

In contrast, according to the semiconductor device 100 and video display system 1 according to an exemplary embodiment of the present disclosure, since the first vertical synchronization signal $S_{S1}$ and the second vertical synchronization signal $S_{S2}$ are masked during the masking period which overlaps with the stabilization period of the PLL circuit 201, the switching of the output video signal takes place after the stabilization period of the PLL circuit 201. Accordingly, in the S/P conversion section 202 of the display 200, the timing when the data conversion processing starts is always after the stabilization period of the PLL circuit 201. As a consequence, in the S/P conversion section 202, data conversion processing is not performed using the pre-stabilization phase synchronization signal $S_{PLL}$. As a result, according to the semiconductor device 100 and video display system 1 according to an exemplary embodiment, the occurrence of disturbance in video images that are displayed on the display 200 when an output video signal is switched, may be suppressed.

Moreover, according to the semiconductor device 100 and video display system 1 of present exemplary embodiment, when the first selector 14 switches a selected video signal based on the first select signal a1, by outputting the post-switching video signal in synchronization with the vertical synchronization signal that corresponds to this post-switching vertical signal, the display 200 is able to become synchronized immediately after the switching of the video signal by using the vertical synchronization signal. Accordingly, the semiconductor device 100 and video display system 1 of present exemplary embodiment may prevent any disturbance in video images that may be generated in conjunction with a switching of the video signal. As a consequence, according to the semiconductor device 100 according to the present exemplary embodiment, it is no longer necessary to mute the video images when switching a video image, in order to prevent video images with disturbance from being displayed.

In addition, when the first selector 14 switches a selected video signal based on the first select signal a1, since the output of the pre-switching video signal is continued until the end point of the frame period of the pre-switching video signal, the semiconductor device 100 according to the present exemplary embodiment may prevent pre-switching video images from being partially dropped and displayed on the display 200 immediately prior to the switching of the video image.

Note that the output of video signals is halted between the end point of the output of the pre-switching video signal and the start point of the output of the post-switching video signal. However, the period when the output of the video signal is halted is a short period, and since the video image immediately prior to the outputting of the video signal being halted remains displayed as an afterimage on the display 200, it is difficult for any interruptions in the video images that occur in conjunction with the halting of the output of the video signal to be recognized by a user. Note that, a buffer memory that is used to hold a pre-switching video signal may be further provided to the semiconductor device 100 according to the present exemplary embodiment. In such case, during the period between the end point of the output of the pre-switching video signal and the start point of the output of the post-switching video signal, the video signal immediately prior to the switching that may be held in the buffer memory, and may be read out and supplied to the display 200. In such case, the occurrence of periods when the outputting of a video signal is halted may be eliminated.

Note that operations of the second selector 12 are the same as those of the first selector 14. Namely, the second selector 12 continues the output of the pre-switching video signal until the end point of the frame period of the pre-switching video signal immediately after the transition of the signal level of the second select signal a2. After the frame period of the pre-switching video signal has ended, the second selector 12 outputs the post-switching video signal in synchronization with the vertical synchronization signal that corresponds to it. Namely, when the second selector 12 is switching a selected video signal based on the second select signal a2, the second selector 12 synchronizes the timing at which the output of the pre-switching video signal is ended with the vertical synchronization signal that corresponds to this pre-switching video signal, and synchronizes the timing at which the output of the post-switching video signal is started with the vertical synchronization signal that corresponds to this post-switching video signal.

Note that, in the present exemplary embodiment, a configuration is employed in which the counter 21 of the masking section 20 determines the masking period using a count value obtained by counting the pulse number of the first horizontal synchronization signal $S_{H1}$ or the second horizontal synchronization signal $S_{H2}$. However, any pulse signal having a higher frequency than the vertical synchronization signal instead of the first horizontal synchronization signal $S_{H1}$ or the second horizontal synchronization signal $S_{H2}$ may be employed. However, the semiconductor device 100 is provided with a counter that counts horizontal synchronization signals, for example, in the scaling processing section 13 that sets the size of the video images displayed on the display 200. Accordingly, by establishing the masking period using a count value of the horizontal synchronization signal in the masking section 20, the counter can be shared by the masking section 20 and the scaling processing section 13. As a result, the circuit size and circuit surface area of the semiconductor device may be reduced.

Second Exemplary Embodiment

Figure 7:
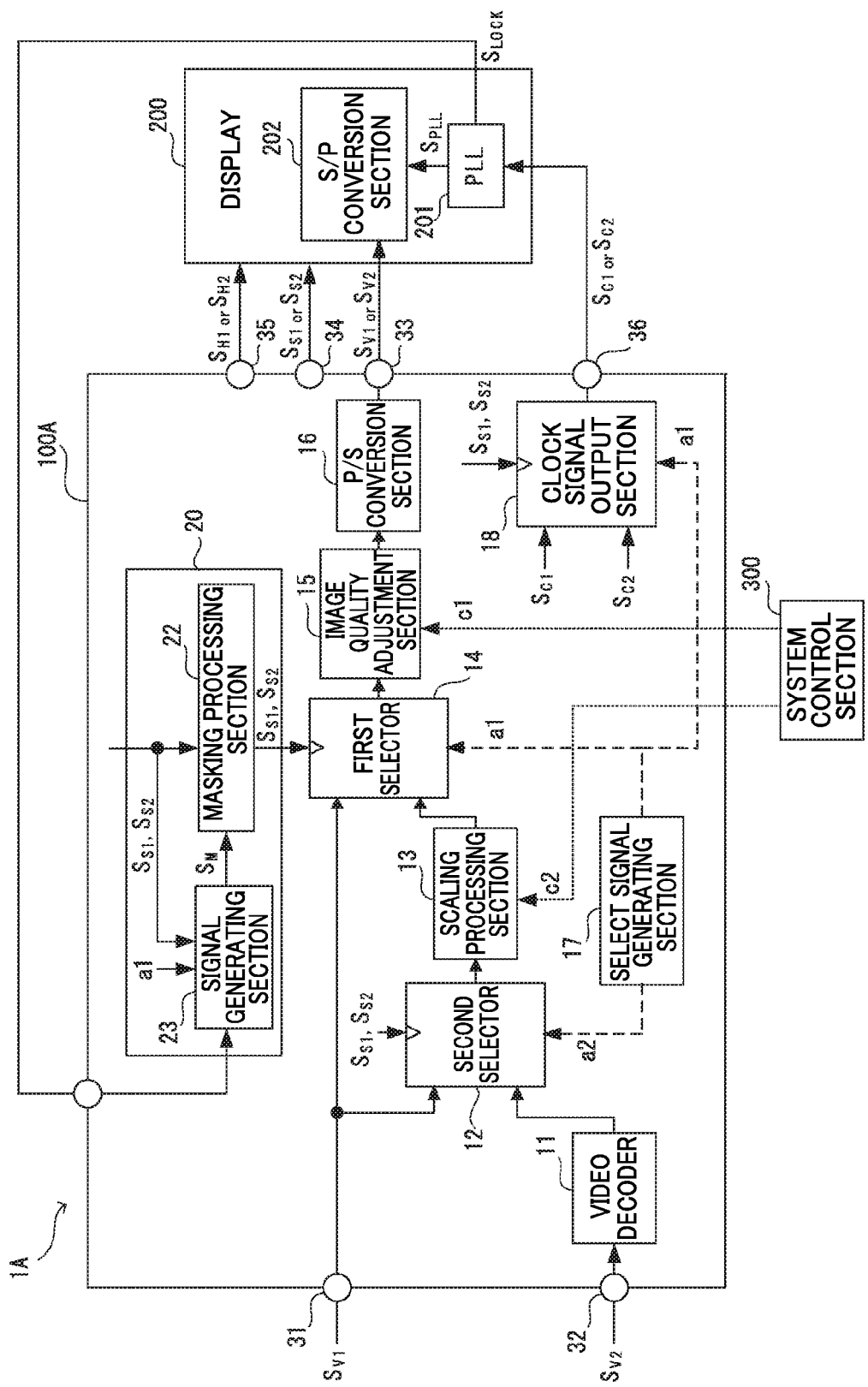
FIG. 7 is a block diagram illustrating the configuration of a video display system and a semiconductor device according to alternative exemplary embodiment of the present disclosure.

FIG. 7 is a block diagram illustrating the configuration of a video display system 1A which includes a semiconductor device 100A according to a second exemplary embodiment of the present disclosure, in the semiconductor device 100A according to the present exemplary disclosure, the configuration of the masking section 20 differs from that of the above-described semiconductor device 100 of the first exemplary embodiment. Moreover, in the video display system 1A, the PLL circuit 201 of the display 200 outputs a lock detection signal $S_{LOCK}$ of a high level indicating that the PLL circuit 201 is in a locked state (the phase synchronization signal $S_{PLL}$ is stable), and outputs a lock detection signal $S_{LOCK}$ of a low level indicating that the PLL circuit 201 is not in a locked state (the phase synchronization signal $S_{PLL}$ is not stable), and supplies the lock detection signal $S_{LOCK}$ to the masking section 20.

In the semiconductor device 100A according to the present exemplary embodiment, the masking section 20 includes a signal generating section 23 and a masking processing section 22. The signal generating section 23 generates a masking signal $S_M$ based on the lock detection signal $S_{LOCK}$, and supplies the masking signal $S_M$ to the masking processing section 22. In the present exemplary embodiment, the signal level of the masking signal $S_M$ is an inversion of the signal level of the lock detection signal $S_{LOCK}$.

During the period when the masking signal $S_M$ is in a high level, the masking processing section 22 performs masking processing on the input first vertical synchronization signal $S_{S1}$ and second vertical synchronization signal $S_{S2}$, and supplies the first vertical synchronization signal $S_{S1}$ and second vertical synchronization signal $S_{S2}$ that have undergone masking processing to the first selector 14. During the masking period, level transitions generated in the first vertical synchronization signal $S_{S1}$ and second vertical synchronization signal $S_{S2}$ are made invalid. Accordingly, during the masking period, the first selector 14 is unable to output a post-switching video signal in synchronization with a vertical synchronization signal.

FIG. 8 is a timing chart illustrating an example of operations of the semiconductor device 100A and the display 200 of the present exemplary embodiment. In FIG. 8 are illustrated temporal transitions of the first vertical synchronization signal $S_{S1}$, the second vertical synchronization signal $S_{S2}$, the first select signal a1, the masking signal $S_M$, the output vertical synchronization signal, the output video signal, the output clock signal, the origin of the phase synchronization signal $S_{PLL}$, the lock detection signal $S_{LOCK}$, and the video signal displayed on the display 200. In FIG. 8, as an example, an operation performed when the output video signal is switched from the second video signal $S_{V2}$ to the first video signal $S_{V1}$ is illustrated.

The PILL circuit 201 of the display 200 detects whether or not itself is in a locked state, and if it does detect that itself is in a locked state, outputs a lock detection signal $S_{LOCK}$ of a high level, and in all other cases outputs a lock detection signal $S_{LOCK}$ of a low level. Namely, the lock signal $S_{LOCK}$ is in a low level during a stabilization period which lasts until the phase synchronization signal $S_{PLL}$ has stabilized, and turns to a high level when the phase synchronization signal $S_{PLL}$ is stable. The phase synchronization signal $SP_{PLL}$ output from the PLL circuit 201 is supplied to the signal generating section 23 of the semiconductor device 100A.

The signal generating section 23 generates a masking signal $S_M$ in which the signal level of the lock detection signal $S_{LOCK}$ is inverted, and supplies this signal to the masking processing section 22. Consequently, during the stabilization period of the PLL circuit 201, the first vertical synchronization signal $S_{S1}$ and the second vertical synchronization signal $S_{S2}$ are masked. As a result, the first selector 14 does not switch the video signal selection within the stabilization period of the PLL circuit 201, but instead outputs the first vertical synchronization signal $S_{V1}$, which is the post-switching video signal, at the timing of the rise of the first vertical synchronization signal $S_{S1}$ that is generated after the masking period (i.e., during the stabilization period of the PLL circuit 201). As a consequence, after the stabilization period of the PLL circuit 201 has ended, the first vertical synchronization signal $S_{V1}$, which is the post-switching video signal, is input into the S/P conversion section 202 of the display 200. As a result, the S/P conversion section 202 is able to perform data conversion processing on the input vertical synchronization signal $S_{V1}$ in synchronization with the post-stabilization phase synchronization signal $S_{PLL}$. By doing this, the present exemplary embodiment may suppress the occurrence of disturbance in video images that are displayed on the display 200 during the switching of an output video signal.

Note that, as in the semiconductor device 100 according to the above-described first exemplary embodiment, it is also possible to set the timing of the rise of the masking signal $S_M$ based on the timing of the rise of the vertical transition signal $S_{S2}$ that corresponds to the pre-switching video signal immediately after the transition of the signal level of the first select signal a1. In addition, it is also possible to alter the signal levels of the masking signal $S_M$ and the lock detection signal $S_{LOCK}$ as is appropriate.

What is claimed is:

1. A semiconductor device comprising:
a selection circuit configured to select one video signal from a plurality of input video signals, and output the selected video signal;
a clock signal output circuit configured to output a clock signal from among a plurality of clock signals that correspond respectively to the plurality of video signals, the clock signal corresponding to the selected video signal output by the selection circuit;
a masking circuit configured to, for a predetermined period starting from a point when the clock signal output from the clock signal output circuit is switched in accordance with a switching of selection of the video signal by the selection circuit, perform masking processing on a synchronization signal from among a plurality of synchronization signals that correspond respectively to the plurality of video signals, the synchronization signal corresponds to the video signal selected by the selection circuit,
wherein the selection circuit is configured to output the selected video signal in synchronization with the synchronization signal that corresponds to the selected video signal and that has undergone masking processing; and
a select signal generating circuit configured to generate a select signal that indicates which video signal should be selected from among the plurality of video signals,
wherein the selection circuit is further configured to select one of the plurality of video signals based on the select signal, switch the video signal selected in accordance with a transition of a signal level of the select signal, output a pre-switching video signal until an end point of a frame period of the pre-switching video signal after the transition of the signal level of the select signal has occurred, and thereafter output a post-switching video signal in synchronization with the synchronization signal that corresponds to the post-switching video signal.

2. The semiconductor device according to claim 1, wherein the masking circuit comprises a counter configured to count a pulse number of an input pulse signal, and
the masking circuit is configured to mask the synchronization signal that corresponds to the video signal selected by the selection circuit during a period from a point when the clock signal output from the clock signal output circuit is switched until a count value of the counter reaches a predetermined value.

3. The semiconductor device according to claim 2, wherein the input pulse signal is a horizontal synchronization signal that corresponds to one of the plurality of video signals.

4. The semiconductor device according to claim 1, wherein the masking circuit is configured to mask the synchronization signal that corresponds to the video signal selected by the selection section based on an external signal supplied from outside of the semiconductor device.

5. The semiconductor device according to claim 1, wherein the selection circuit is configured to halt the output of the video signal from an end point of the output of the pre-switching video signal until a start point of the output of the post-switching video signal.

6. A video display system comprising:
the semiconductor device according to claim 1; and
a display configured to display video images in accordance with the video signal selected by the selection circuit from among the plurality of video signals.

7. The video display system according to claim 6, wherein the display comprises:
- a phase synchronization signal generating circuit configured to receive a clock signal output from the clock signal output circuit, and generate a phase synchronization signal that is in phase synchronization with the clock signal; and
- a signal processing circuit configured to perform predetermined processing on the video signal selected by the selection circuit in synchronization with the phase synchronization signal.

8. The video display system according to claim 7, wherein the signal processing circuit is configured to convert a video signal input as serial data into parallel data.

9. An image signal output method comprising:
- selecting one video signal from a plurality of input video signals;
- outputting the selected video signal and a clock signal that corresponds to the selected video signal from a plurality of clock signals that correspond respectively to the plurality of video signals;
- performing masking processing for a predetermined period starting from a point when the clock signal output in accordance with a switching of the selection of the video signal is switched, wherein the masking processing masks a synchronization signal that corresponds to the selected video signal from among a plurality of synchronization signals that correspond respectively to the plurality of video signals;
- outputting the selected video signal in synchronization with a synchronization signal that corresponds to the selected video signal and that has undergone the masking processing; and
- generating a select signal that indicates which video signal should be selected from among the plurality of video signals,
- wherein said selecting the video signal is based on the select signal and comprises switching the video signal selected in accordance with a transition of a signal level of the select signal, outputting a pre-switching video signal until an end point of a frame period of the pre-switching video signal after the transition of the signal level of the select signal has occurred, and thereafter outputting a post-switching video signal in synchronization with the synchronization signal that corresponds to the post-switching video signal.

* * * * *